US008280678B2

(12) United States Patent
Lee et al.

(10) Patent No.: US 8,280,678 B2
(45) Date of Patent: Oct. 2, 2012

(54) STEP LENGTH ESTIMATION METHOD AND PORTABLE TERMINAL FOR THE SAME

(75) Inventors: Jae-Myeon Lee, Yongin-si (KR); Hyun-Su Hong, Seongnam-si (KR); Chan-Gook Park, Seoul (KR); Jin-Won Kim, Seoul (KR); Kyong-Ha Park, Suwon-si (KR); Ji-Heon Oh, Yongin-si (KR)

(73) Assignees: Samsung Electronics Co., Ltd., Suwon-si (KR); Seoul National University Industry Foundation, Seoul (KR)

(*) Notice: Subject to any disclaimer, the term of this patent is extended or adjusted under 35 U.S.C. 154(b) by 378 days.

(21) Appl. No.: 11/932,192

(22) Filed: Oct. 31, 2007

(65) Prior Publication Data

US 2008/0120062 A1  May 22, 2008

(30) Foreign Application Priority Data

Oct. 31, 2006  (KR) .................. 10-2006-0106917

(51) Int. Cl.
*G01C 22/00* (2006.01)
*G01C 17/38* (2006.01)
(52) U.S. Cl. ....................... 702/160; 701/527
(58) Field of Classification Search .......... 702/160, 702/127, 149, 158, 179, 199, 33, 41, 57, 702/141–142, 155, 189–195; 377/24.2; 33/700, 33/701; 701/200, 217, 300, 400, 500, 527, 701/534, 538, 541; 700/28–34, 52, 61–64, 700/67, 69
See application file for complete search history.

(56) References Cited

U.S. PATENT DOCUMENTS

| | | | | | |
|---|---|---|---|---|---|
| 5,583,776 | A | * | 12/1996 | Levi et al. | 701/217 |
| 5,899,963 | A | * | 5/1999 | Hutchings | 702/145 |
| 5,976,083 | A | * | 11/1999 | Richardson et al. | 600/300 |
| 6,493,652 | B1 | * | 12/2002 | Ohlenbusch et al. | 702/160 |
| 6,571,193 | B1 | * | 5/2003 | Unuma et al. | 702/141 |
| 6,826,477 | B2 | * | 11/2004 | Ladetto et al. | 701/217 |
| 7,246,033 | B1 | * | 7/2007 | Kudo | 702/160 |
| 2004/0064286 | A1 | * | 4/2004 | Levi et al. | 702/141 |

FOREIGN PATENT DOCUMENTS

| KR | 10-2005-0095326 A | 9/2005 |
|---|---|---|
| KR | 10-2007-0032170 A | 3/2007 |

OTHER PUBLICATIONS

Gerhauser et al., The Electronic Shoe for Jogging, Sports and Reconvalescence, 1989 IEEE, pp. 3-167 to 3-169.*
Cho et al., Sensor Fusion and Error Compensation Algorithm for Pedestrian Navigation System, Oct. 22-25, 2003, ICCAS2003, pp. 1001-1006.*
Shin et al., MEMS-Based Personal Navigator Equipped on the User's Body, Sep. 13-16, 2005, ION GNSS 18th International Technical Meeting of the Satellite Division, Long Beach, CA, pp. 1998-2002.*

* cited by examiner

*Primary Examiner* — Toan M Le
(74) *Attorney, Agent, or Firm* — Jefferson IP Law, LLP

(57) ABSTRACT

An apparatus and method for estimating a step length of a user are provided. The apparatus and method use a step length estimation algorithm, e.g. a step length estimation parameter coefficient, according to a movement state of a user, i.e. whether the movement state is a walking state or a running state. The movement state of the user is determined on the basis of an acceleration variance value of an acceleration signal output from an accelerometer. Accordingly, the apparatus and method prevent errors in step length determinations.

12 Claims, 11 Drawing Sheets

RELATION BETWEEN WALKING
FREQUENCIES AND STEP LENGTHS

RELATION BETWEEN ACCELERATION
VARIANCES AND STEP LENGTHS

STEP LENGTH ESTIMATION METHOD AND PORTABLE TERMINAL FOR THE SAME

PRIORITY

This application claims the benefit under 35 U.S.C. §1191(a) of a Korean patent application filed in the Korean Industrial Property Office on Oct. 31, 2006 and assigned Serial No. 2006-106917, the entire disclosure of which is hereby incorporated by reference.

JOINT RESEARCH AGREEMENT

The claimed invention was made by, on behalf of, and/or in connection with one or more of the following parties to a joint research agreement: Samsung Electronics Co. Ltd. and Seoul National University Industry Foundation. The agreement vas in effect on and before the date the claimed invention was made, and the claimed invention was made as a result of activities undertaken within the scope of the agreement.

BACKGROUND OF THE INVENTION

1. Field of the Invention

The present invention relates to a portable terminal. More particularly, the present invention relates to a step length estimation method and a portable terminal for implementing the method.

2. Description of the Related Art

In recent years, as interest in personal health has increased, apparatuses that measure movement by determining movement distances have been developed. The apparatuses are occasionally mounted to mobile communication terminals carried by users.

Such a measuring apparatus estimates the step length of a user to accurately measure the number of steps of the user and therefore movement distance. The estimation of a step length uses a walking frequency and an acceleration variance which are parameters that reflect the characteristics of the change of a step length according to a step pattern. FIG. 1A is a view illustrating a relation between step lengths and walking frequencies, and FIG. 1B is a view illustrating a relation between step lengths and acceleration variances. Referring to FIGS. 1A and 1B, it can be seen that the step lengths have linear relations with the walking frequencies and the acceleration variances. Therefore, a step length can be represented by a linear combination of the two parameters of walking frequency and acceleration variance as in equation (1) below.

$$\text{Step length} = a_1 WF + a_2 AV + b \quad (1)$$

In equation (1), $a_1$, $a_2$ are weights of a walking frequency and an acceleration variance, b is a constant term, WF is a walking frequency, and AV is an acceleration variance.

Therefore, since a walking frequency and a variance value of an accelerometer output when one step is generated can be calculated, the total movement distance can be calculated as in Equation (2) below by summating step lengths when several steps are generated.

$$\text{Movement distance} = \sum_{i=1}^{n} (a_1 WF + a_2 AV + b)_i \quad (2)$$

In equation (2), n is the number of detected steps, and $a_1$, $a_2$, b are weights in a linear combination of a walking frequency and an acceleration variance and are calculated by a linear regression.

Step length estimation parameter coefficients are obtained by modeling the relation between a step length and a walking frequency and the relation between a step length and an acceleration variance. However, in the case in which the modeling is performed by integrating a walking state and a running state of a user without discriminating between the two states, in all of the first order model and the second order model, the step length estimation efficiency is lowered to approximately 84 to 83 percent. This is because the patterns of the walking frequency and the acceleration variance are different in a walking state than in a running state and a considerable error is included in the step length estimation parameter coefficient when the states are integrated and modeled. Therefore, a method for estimating a step length using a different step length estimation parameter coefficient according to a walking state and a running state is necessary.

SUMMARY OF THE INVENTION

An aspect of the present invention is to address the above-mentioned problems and/or disadvantages and to provide at least the advantages described below. Accordingly, an aspect of the present invention is to provide a portable terminal and a method which can accurately detect a step length by considering a movement state of a user.

In accordance with an aspect of the present invention, a portable terminal is provided. The portable terminal includes an accelerometer for detecting and outputting an acceleration signal of at least one axis, a step detection unit for determining an acceleration variance value from an output signal of the accelerometer, a movement state determination unit for determining whether the acceleration variance value is larger than a critical value for movement state determination and for determining that a user is in a running state if the acceleration variance value is larger than the critical value and determining that the user is in a walking state if the acceleration variance value is smaller than the critical value and a step estimation unit for using different step estimation algorithms according to the movement states of the user.

In accordance with another aspect of the present invention, a step length estimation method in a portable terminal including an accelerometer for detecting and outputting an acceleration signal of at least one axis is provided. The method includes determining an acceleration variance value from an output signal of the accelerometer, determining whether the acceleration variance value is larger than a critical value movement state determination, determining that a user is in a running state it the acceleration variance value is larger than the critical value and determining that the user is in a walking state if the acceleration variance value is smaller than the critical value and using different step estimation algorithms according to the movement states of the user.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention use different step estimation algorithms, e.g. different step estimation parameters, according to different movement states of a user. For example, different step estimation algorithms are used corresponding to whether the movement state of a user is a walking state or a running state. The movement state of a user is determined on the basis of an acceleration variance value of an acceleration signal output from an accelerometer. The elements and the operation of an exemplary portable terminal which includes a movement distance measuring unit realizing the above-mentioned function will be described with reference to FIG. 2.

Figure 1A:
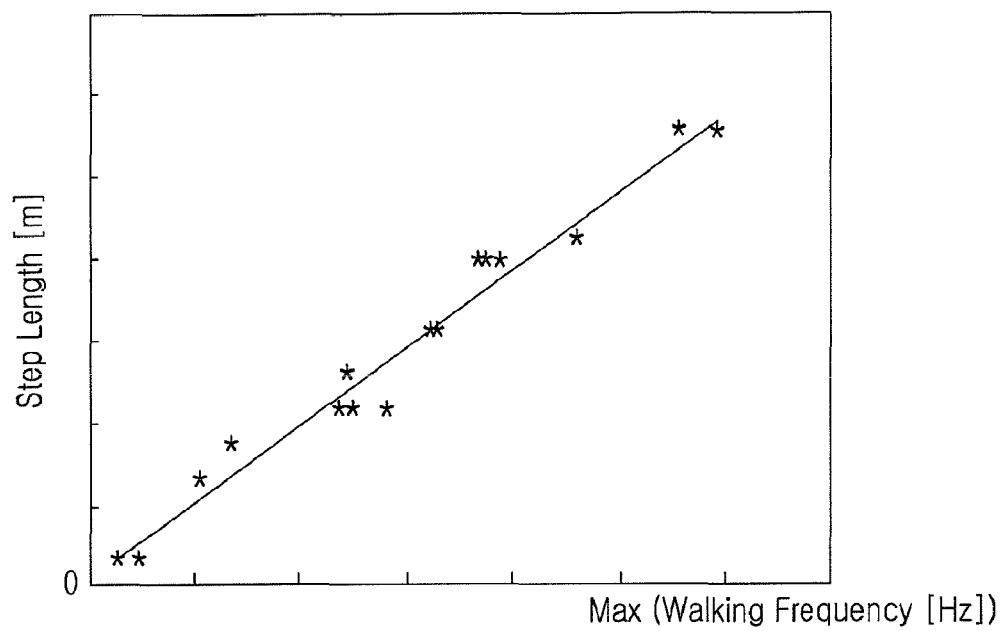
FIG. 1A is a view illustrating a relation between step lengths and walking frequencies.
Figure 1B:
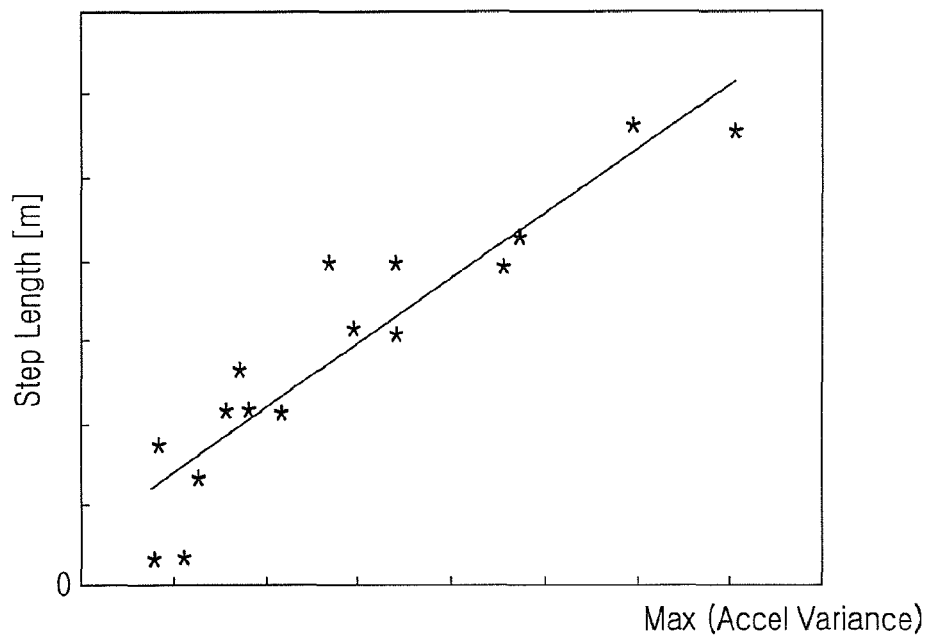
FIG. 1B is a view illustrating a relation between step lengths and acceleration variances.
Figure 2:
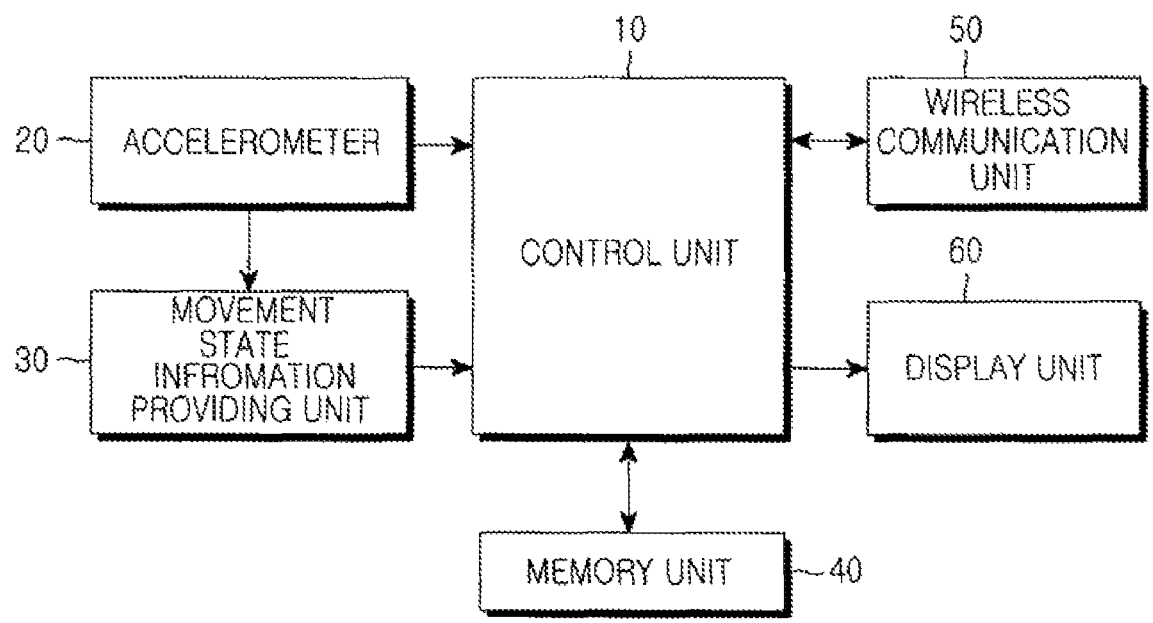
FIG. 2 is a block diagram illustrating an exemplary portable terminal of the present invention which includes a movement distance measuring apparatus.

FIG. 2 is a block diagram illustrating a portable terminal according to an exemplary embodiment of the present invention. Referring to FIG. 2, the portable terminal includes a control unit 10, an accelerometer 20, a movement state information providing unit 30, a memory unit 40, a wireless communication unit 50, and a display unit 60.

The control unit 10 controls the overall operation of the portable terminal. Further, the control unit 10 may receive information from the movement state information providing unit 30 and can display the information on the display unit 60.

The display unit 60 may include a liquid crystal display (LCD) and displays information output from the movement state information providing unit 30 according to an exemplary embodiment of the present invention. The memory unit 50 may store a plurality of applications and data. Further, the memory unit 50 stores algorithms for functions performed by the movement state information providing unit 30 according to an exemplary embodiment of the present invention. The algorithms stored by the memory unit 50 may include a step detection algorithm, a movement state determination algorithm, a step length estimation algorithm, and a movement amount measurement algorithm. A wireless communication unit 50 generally performs wireless communication with a base station.

The movement state information providing unit 30 determines a movement state of a pedestrian from a signal output from the accelerometer 20 and uses a step length estimation parameter coefficient according to the determined movement state. In this case, the movement state information providing unit 30 determines the movement state of the user on the basis of an acceleration variance value.

Figure 3:
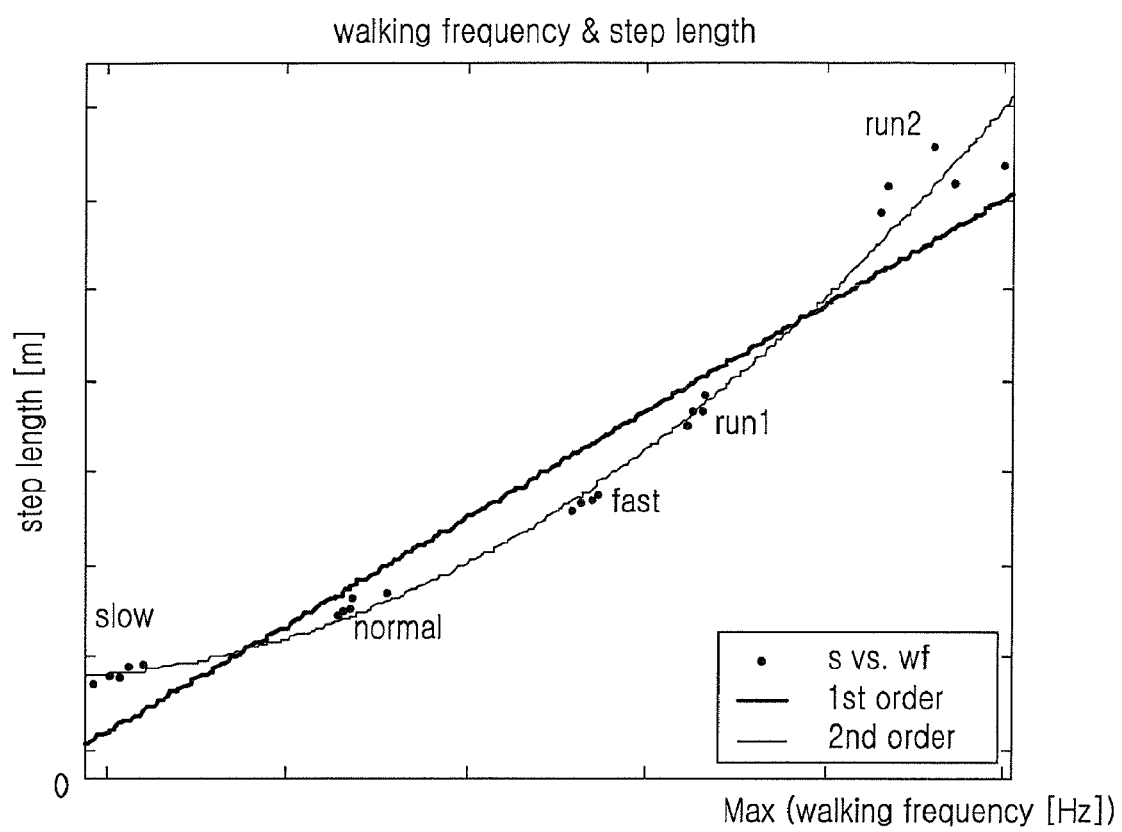
FIG. 3 is a view illustrating a relation between walking frequencies and step lengths according to the movement states of a user.

More particularly, the acceleration variance value corresponds to the movement state of a user. FIG. 3 is a view illustrating the relation between walking frequencies and step lengths according to the movement states of a user, and FIG. 4 is a view illustrating the relation between acceleration variance values and step lengths according to the movement states of a user.

Referring to FIG. 3, it can be seen that the difference between a fast walking state (fast) and a slow running state (run1) is very small. Further, since a user can walk or run even at the same speed, the movement state cannot be recognized using the walking frequency.

Figure 4:
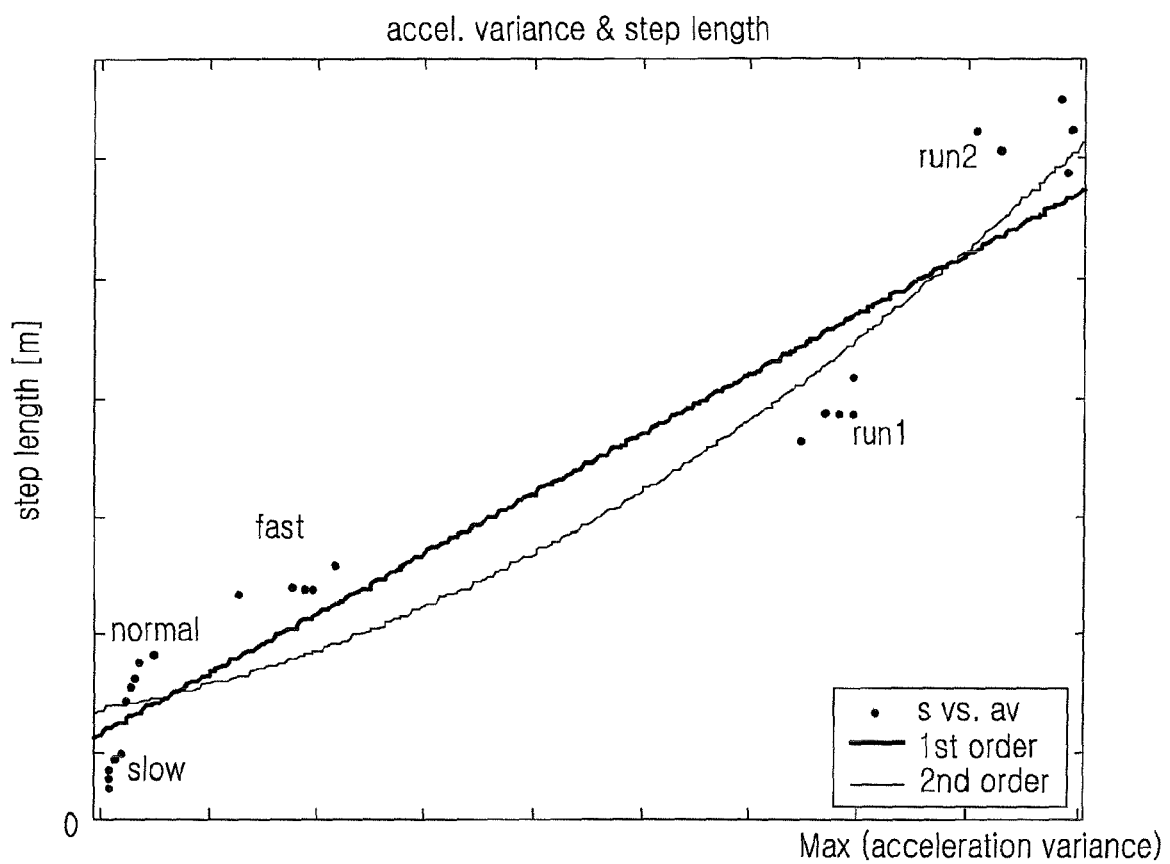
FIG. 4 is a view illustrating the relation between acceleration variance values and step lengths according to the movement states of a user.

However, referring to FIG. 4, it can be seen that the acceleration variance values in a fast walking state (fast) and in a slow running state (run1) are greatly different as compared with the walking frequencies. This is because even when a user runs slowly, an output signal of the accelerometer is greatly different from an output signal in a walking state by an impact applied when a foot makes contact with the ground.

Figure 5:
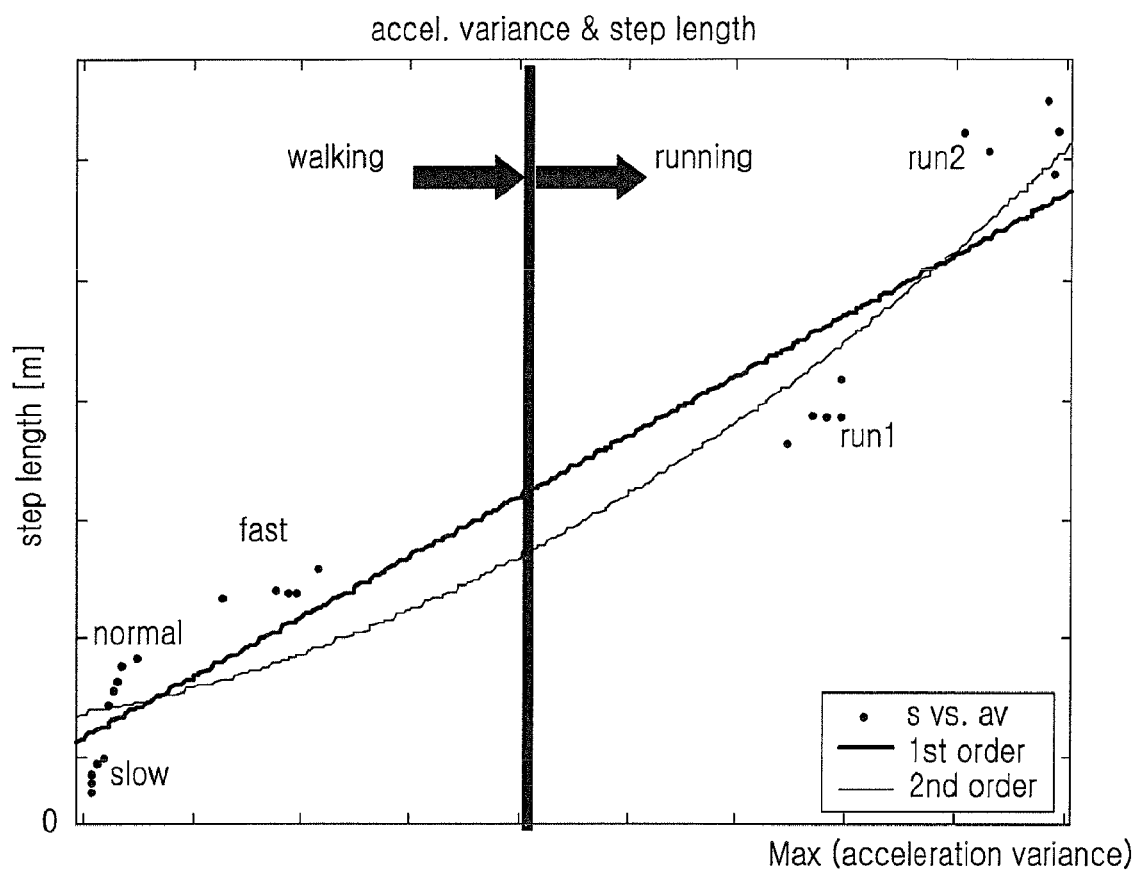
FIG. 5 is a view illustrating an analysis of the movement state of a user the magnitudes of the acceleration variance values.

Accordingly, as illustrated in FIG. 5, the walking state and the running state are separated using the magnitudes of the acceleration variance values.

Figure 6A:
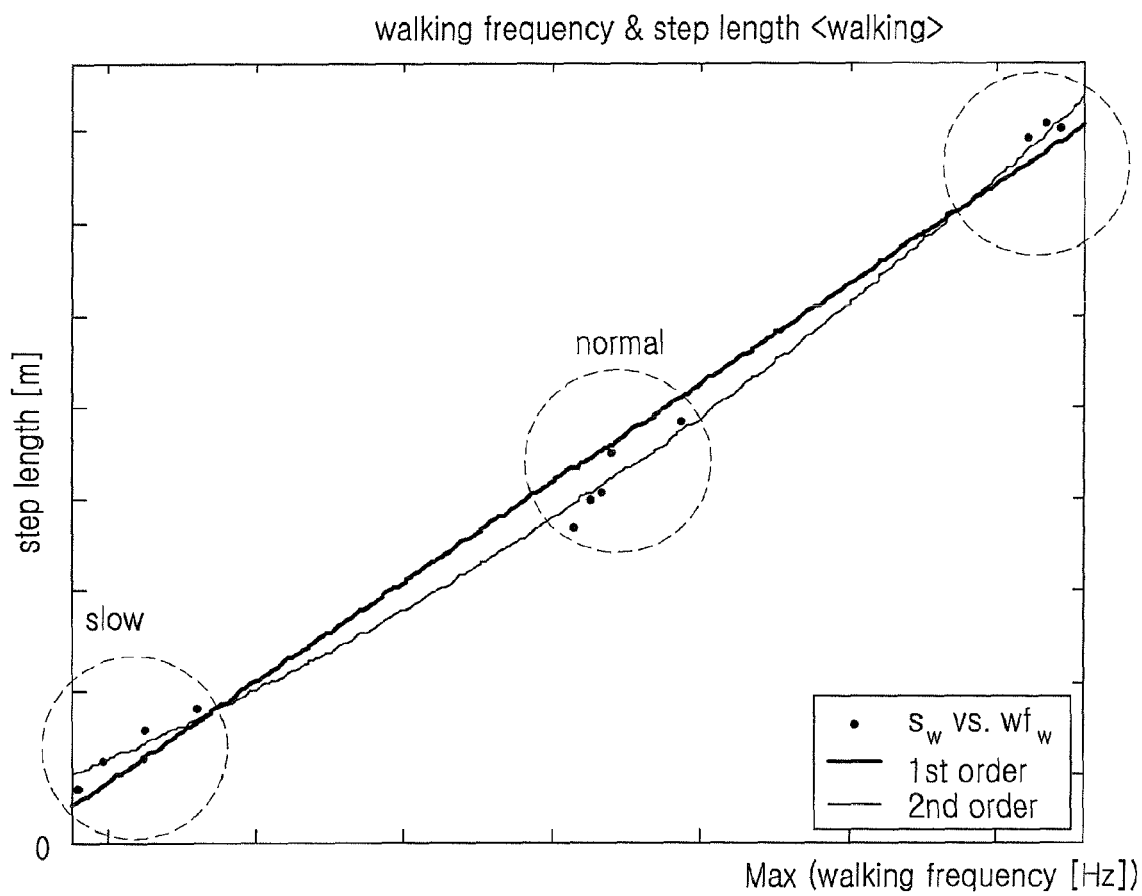
FIGS. 6A to 7B are views illustrating wave forms obtained by modeling relations between step lengths and walking frequencies and acceleration variances to determine walking frequencies and acceleration variances suitable for movement states of a user according to an exemplary embodiment of the present invention.
Figure 6B:
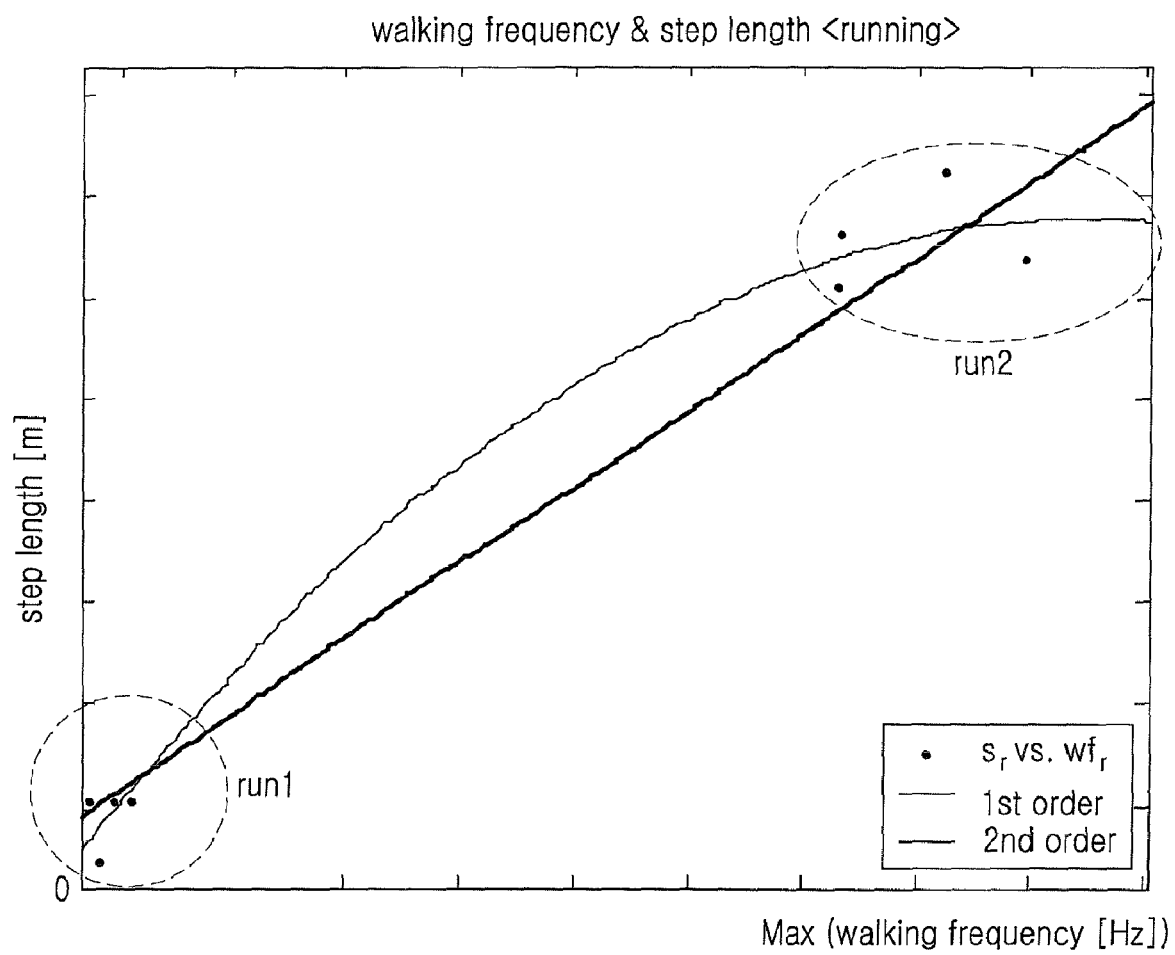

Further, exemplary embodiments of the present invention determine the coefficients of walking frequencies and acceleration variances suitable for various movement states by modeling the coefficients as in FIGS. 6A to 7B. Referring to FIGS. 6A to 7B, a first order model and a second order model may be used as the step length estimation model. FIG. 6A illustrates a model for estimating a walking frequency coefficient in a walking state and FIG. 6B illustrates a model for estimating a walking frequency coefficient in a running state.

Figure 7A:
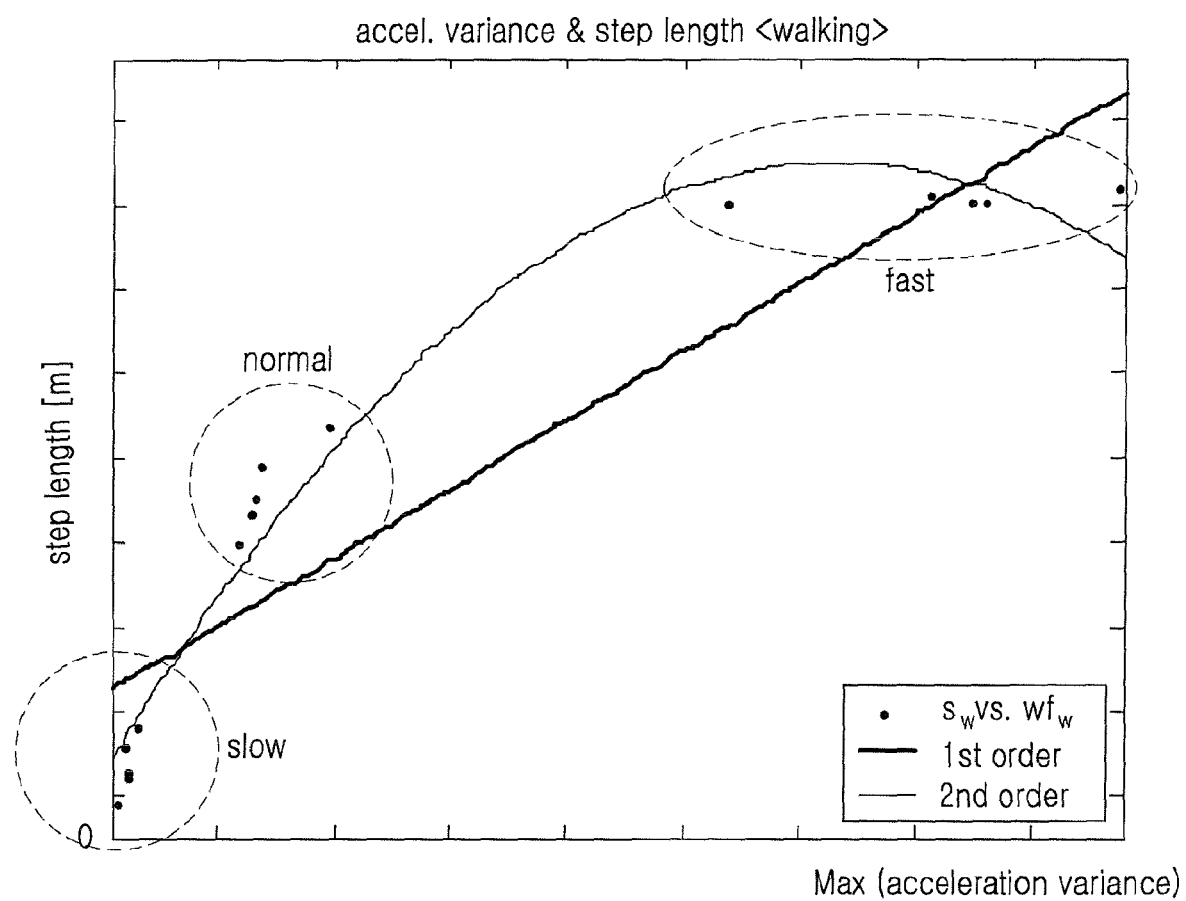
Figure 7B:
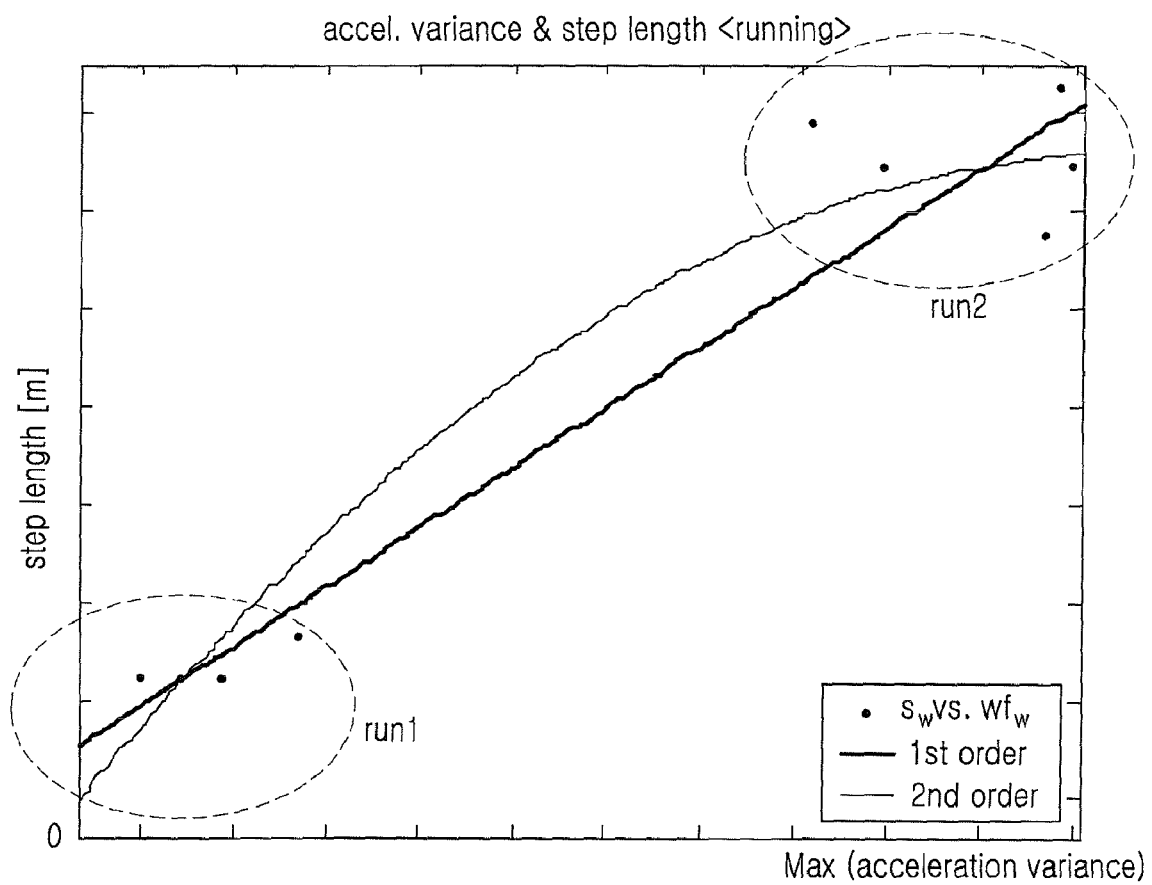

FIG. 7A illustrates a model for estimating an acceleration variance coefficient in a walking state and FIG. 7B illustrates a model for estimating an acceleration variance coefficient in a running state.

The coefficients of walking frequencies and acceleration variances suitable for various movement states may be stored in the memory unit 40. Alternatively, they may be stored in the movement state information providing unit 30. Accordingly, the coefficients of the walking frequencies and the acceleration variances suitable for the movement states are used to estimate a step length.

Figure 8:
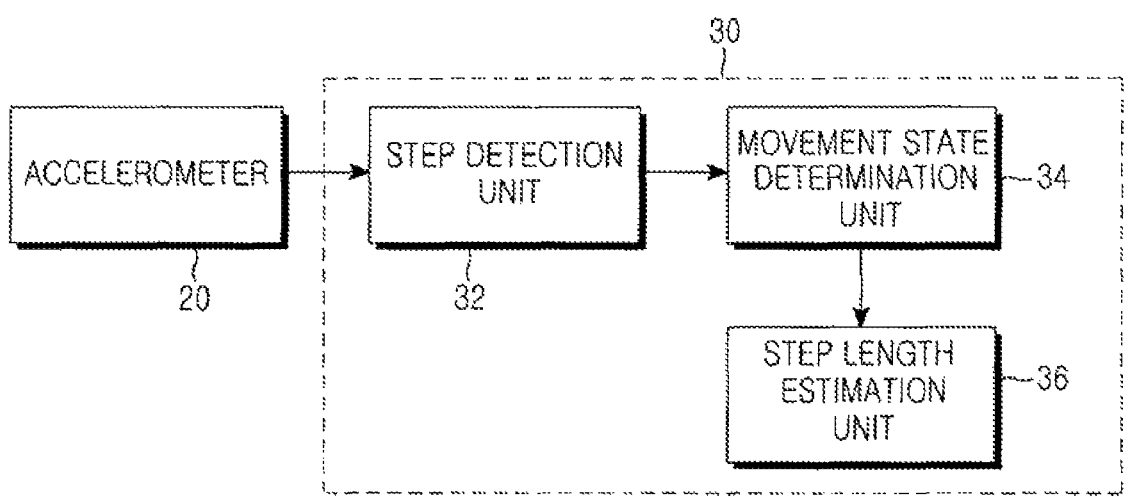
FIG. 8 is a block diagram illustrating a movement state information providing unit according to an exemplary embodiment of the present invention.

An exemplary movement state information providing unit will be described in detail with reference to FIG. 8. FIG. 8 is a block diagram illustrating a movement state information providing unit according to an exemplary embodiment of the present invention.

Referring to FIG. 8, the movement state information providing unit 30 includes a step detection unit 32, a movement state determination unit 34, and a step length estimation unit 36.

The step detection unit 32 is provided with an output signal of the accelerometer 20. It can be noted here that in an exemplary embodiment, the accelerometer 20 is mounted separately from the movement distance measuring apparatus 30. However, in another exemplary embodiment the movement state information providing unit may include the accelerometer 20 in the case in which the movement state information providing unit is provided by itself.

The accelerometer 20 is a Micro Electro Mechanical System (MEMS) type accelerometer, i.e. a subminiature accelerometer, and may be mounted to a portable terminal or an individual navigation device such as a personal digital assistant (PDA). The accelerometer 20 can detect accelerations on at least two axes. According to exemplary embodiments of the present invention, the accelerometer can be realized using a three-axis accelerometer or three one-axis accelerometers. The accelerometer is mounted to the portable terminal so that three axes are disposed in a lateral direction (the right or left direction), a forward direction, and a downward direction. Then, although the axes are accurately disposed, since the acceleration components by walking are important in the present embodiment, the characteristics of the accelerometer can be maintained even though the axes are deviated from the directions iii a range which does not influence the acceleration signal detection. The accelerometer detects linear movements in the lateral direction, the forward direction, and the downward direction of a pedestrian, and outputs an acceleration signal corresponding to the detection result.

The step detection unit 32 determines a walking frequency and an acceleration variance value from the acceleration signal output from the accelerometer 20.

More particularly, the step detection unit 32 uses a signal obtained by squaring the signals or the three axes, which are output from the accelerometer 20, and summating the resultant square values. Also, the step detection unit 32 removes noise included in the signals and error components by applying a sliding window summation and a low-pass filtering. The sliding window summation method is a signal processing method adding the acceleration values in a window section by moving a window of a certain size with respect to the time axis. Thereafter, the step detection unit 32 determines the variance value of the sliding window summation value and outputs the determined variance value to the movement state determination unit 34. As mentioned above, the movement state determination unit 34 determines the movement state of a user on the basis of the acceleration variance value. More particularly, as illustrated in FIG. 5, the movement state determination unit 34 determines that a user is in a walking state if the acceleration variance value is smaller that a critical value for movement state determination, e.g. approximately 0.8 in FIG. 5. Further, the movement state determination unit 34 determines that a user is in a running state if the acceleration variance value is larger that the critical value, e.g. approximately 0.8 in FIG. 5.

Further, the movement state determination unit 34 outputs the result on the movement state determination to the step length estimation unit 36. The step length estimation unit 36 estimates a step length using a different step length estimation parameter coefficient according to the movement state of a user.

Figure 9:
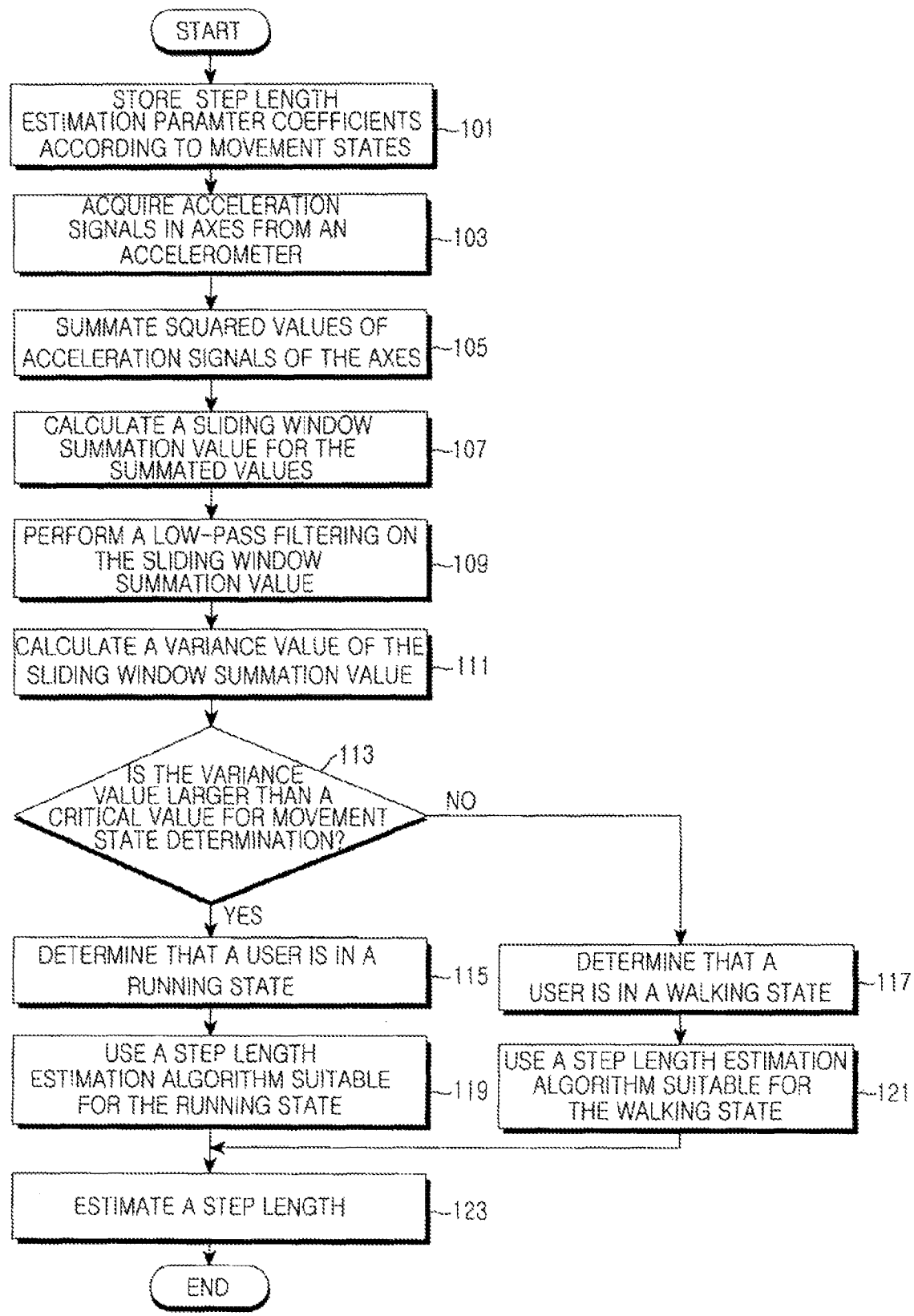
FIG. 9 is a flow chart illustrating a method of using a different step length estimation parameter coefficient in correspondence to a movement state of a user according to an exemplary embodiment of the present invention.

FIG. 9 is a flow chart illustrating a method using a different step length estimation parameter coefficient in correspondence to a movement state of a user according to an exemplary embodiment of the present invention.

Referring to FIG. 9, the movement state information providing unit 30 stores step length estimation parameter coefficients according to movement states of a user in step 101. As mentioned above, the step length estimation parameter coefficients are determined in advance and are stored. Accordingly, when a movement state of a user is determined, suitable step length estimation parameter coefficients may be used according to the determined movement state of the user. The step length estimation parameter coefficients may be stored in the movement state information providing unit 30 or in the memory unit 40.

The movement state information providing unit 30 acquires output signals of the axes from the accelerometer 20 in step 103. The movement state information providing unit 30 squares the values of the output signals in the axes of the accelerometer 20 and summates the squared values in step 105.

The acceleration signals of the axes, which are output from the accelerometer 20, include various errors as well as noise. Because the axes of the accelerometer 20 are not accurately fixed but are shaken in the case in which the accelerometer 20 is mounted to a hand-held apparatus such as a portable terminal, noise, biases, conversion coefficient errors, and non-arrangement errors may be generated more severely. In this way, noise, biases, and various errors included in the acceleration signals influence the detection of a step pattern, thus obstructing accurate detection of a step.

Therefore, a movement distance measurement unit 120 according to an exemplary embodiment of the present invention performs a sliding window summation with respect to the summed value in step 107, and removes the noise included in the summation value.

However, even if the sliding window summation is performed and the noise included in the acceleration signal is removed, biases and various errors, such as conversion coefficient errors and non-arrangement errors, are not removed. Therefore, the calculated sliding window summation value may still include a bias and various error components.

Accordingly, the movement state information providing unit 30 removes biases and errors included in the sliding window summation value by performing a low-pass filtering on the sliding window summation value in step 109. That is, the sliding window summation value is signal-processed sufficiently enough to represent a step pattern.

The movement state information providing unit 30 calculates the variance value of the sliding window summation value in step 111. As mentioned above, the acceleration variance value is a value which may be used in recognizing the movement state of a user. If the acceleration variance value is determined, the movement state providing unit 30 determines whether the determined acceleration variance value is larger than a critical value for movement state determination in step 113. The critical value is a value for discriminating a walking state and a running state of a user and is approximately 0.8 in FIG. 5.

If the determined acceleration variance value is larger than the critical value, the movement state information providing unit 30 proceeds to step 115 and determines that the user is in a running state. Thereafter, the movement state information providing unit 30 proceeds to step 119 and selects a step length estimation algorithm suitable for a running state, i.e. a step length estimation parameter coefficient suitable for the running state of the user and proceeds to step 123.

If the determined acceleration variance value is determined to be smaller than the critical value in step 113, the movement state information providing unit 30 proceeds to step 117 and determines that a user is in a walking state. The movement state information providing unit 30 proceeds to step 121 and selects a step length estimation algorithm suitable for a walking state, i.e. a step length estimation parameter coefficient suitable for the walking state of the user and proceeds to step 123.

Accordingly, the state information providing unit 30 can estimate a step sing a step length estimation parameter coefficient suitable for the movement a user in step 123.

Exemplary embodiments of the present invention can accurately measure a movement distance and a movement amount by automatically changing an algorithm using an accelerometer during pedestrian navigation or during jogging. Therefore, information can be accurately and conveniently provided to a user by automatically changing an algorithm with one sensor system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
   an accelerometer for detecting and outputting an acceleration signal of at least one axis;
   a step detection unit for determining an acceleration variance value from the acceleration signal by performing a sliding window summation;
   a movement state determination unit for determining, when steps are detected by the step detection unit, whether a movement state of a user comprises a running state or a walking state based on a comparison between the acceleration variance value and a critical value, wherein the movement state determination unit determines that the movement state comprises the running state if the acceleration variance value is larger than the critical value, and determines that the movement state comprises the walking state if the acceleration variance value is smaller than the critical value; and
   a step length estimation unit for estimating a step length of the user using a different step length estimation algorithm corresponding to each of the determined running state and walking state.

2. A portable terminal according to claim 1, wherein the step detection unit squares the acceleration signal of the at least one axis, summates a resultant square value and performs the sliding window summation and a low-pass filtering on the summated value.

3. A portable terminal according to claim 1, wherein the step length estimation unit estimates a step length of the user using different step length estimation parameter coefficients corresponding to each of the determined running state and walking state.

4. The portable terminal of claim 1, wherein the step detection unit determines the acceleration variance value based on at least three axes of the acceleration signal.

5. A step length estimation method in a portable terminal, the method comprising:
   determining, by a step detection unit, an acceleration variance value from an acceleration signal of at least one axis by performing a sliding window summation;
   determining, by a movement state determination unit, when steps are detected by the step detection unit, whether a movement state of a user comprises a running state or a walking state based on a comparison between the acceleration variance value and a critical value, wherein the determining of the movement state of the user comprises determining that the movement state comprises the running state if the acceleration variance value is larger than the critical value, and determining that the movement state comprises the walking state if the acceleration variance value is smaller than the critical value; and
   estimating, by a step length estimation unit, a step length of the user using a different step length estimation algorithm corresponding to each of the determined running state and walking state.

6. A method according to claim 5, further comprising:
   squaring the acceleration signal of the at least one axis;
   summating a resultant square value; and
   performing the sliding window summation and a low-pass filtering on the summated value.

7. A method according to claim 5, wherein the estimating of the step length of the user comprises using different step length estimation parameter coefficients corresponding to each of the determined running state and walking state.

8. The method of claim 5, wherein the determining of the acceleration variance value comprises determining the acceleration variance value based on at least three axes of the acceleration signal.

9. A portable device comprising:
   a step detection unit for determining an acceleration variance value of at least one axis by performing a sliding window summation;
   a movement state determination unit for determining, when steps are detected by the step detection unit, whether a movement state of a user comprises a running state or a walking state based on a comparison between the acceleration variance value and a critical value, wherein the movement state determination unit determines that the movement state comprises the running state if the acceleration variance value is larger than the critical value, and determines that the movement state comprises the walking state if the acceleration variance value is smaller than the critical value; and
   a step length estimation unit for estimating a step length of the user using a different step length estimation algorithm corresponding to each of the determined running state and walking state.

10. A portable device according to claim 9, further comprising an accelerometer for detecting and outputting the acceleration signal of the at least one axis, wherein the step detection unit determines the acceleration variance value from the acceleration signal.

11. A portable device according to claim 10, wherein the step detection unit squares the acceleration signal of the at least one axis, summates a resultant square value and performs the sliding window summation and a low-pass filtering on the summated value.

12. A portable device according to claim 9, wherein the step length estimation unit estimates the step length of the user using different step length estimation parameter coefficients corresponding to each of the determined running state and walking state.

* * * * *